United States Patent [19]

Eischeid

[11] Patent Number: 5,462,393
[45] Date of Patent: Oct. 31, 1995

[54] DRILLING APPARATUS FOR PRODUCING DRILLED HOLES WITH UNDERCUTS

[76] Inventor: Karl Eischeid, Schulweg 23, 5250 Engelskirchen, Germany

[21] Appl. No.: 286,387

[22] Filed: Aug. 5, 1994

Related U.S. Application Data

[63] Continuation of Ser. No. 865,063, Apr. 8, 1992, abandoned.

[30] Foreign Application Priority Data

Apr. 10, 1991 [DE] Germany .............. 9104326 U

[51] Int. Cl.⁶ .................................. B23B 51/00
[52] U.S. Cl. .................. 408/159; 82/1.2; 408/180
[58] Field of Search .................... 408/153, 159, 408/158, 172, 180, 188; 82/1.2, 1.3

[56] References Cited

U.S. PATENT DOCUMENTS

| | | | |
|---|---|---|---|
| 1,193,426 | 8/1916 | Rollinson . | |
| 2,519,476 | 8/1950 | Kind | 408/159 |
| 2,540,520 | 2/1951 | Hoern | 408/180 |
| 2,734,402 | 2/1956 | Hoern | 408/180 |
| 2,818,753 | 1/1958 | Leggett | 408/180 |
| 3,101,631 | 8/1963 | Huff | 408/153 |
| 3,296,898 | 1/1967 | Osborn, Jr. | 408/159 |
| 4,487,275 | 12/1984 | Froehlich . | |

FOREIGN PATENT DOCUMENTS

| | | | |
|---|---|---|---|
| 2031931 | 6/1970 | Germany . | |
| 2025006 | 4/1971 | Germany . | |
| 511147 | 8/1976 | U.S.S.R. | 82/1.2 |
| 908540 | 2/1982 | U.S.S.R. | 82/1.2 |
| 518688 | 3/1940 | United Kingdom . | |

*Primary Examiner*—Daniel W. Howell
*Attorney, Agent, or Firm*—Charles A. Wilkinson

[57] ABSTRACT

Drilling apparatus (50) for producing drilled holes with undercuts, with a drill (15), the drill shank (19) of which has a side cutting edge (14) protruding radially beyond the periphery (18) of the drill shank, and, on its circumference, opposite the side cutting edge (14), has a flattening, which makes possible the insertion of the side cutting edge (14) into the drilled hole, and the drill shank (19) of which is firmly connected with a connecting coupling (20), which is disposed in an articulated fashion between the drill (15) and a drill driving mechanism, permits wobbling motions of the shank as the drill (15) is rotating and has a drill shank-side coupling (29) with an axially movable indentor (85), which can be supported on an inclined plane (17) of a coupling (29) connected with the drill shank (19), which inclined plane (17) brings about the radial advance of the side cutting edge (14).

In order to improve a drilling apparatus (90) with the aforementioned features in such a manner, that the drill (15), when producing a pre-drilled hole (12) in the workpiece (46), can be guided forcibly against radial motions by the axial advance of the drill (15) or pulled out of the finished, undercut, drilled hole, even when a self-alignment of the drill-shank side coupling (29) taking place as a result of centrifugal forces is not or not adequately possible, this apparatus is constructed so that the indentor (85) axially overlaps the drill shank-side coupling (29) in a position, which is not acted upon axially and is radially coupled positively with this coupling (29).

15 Claims, 2 Drawing Sheets

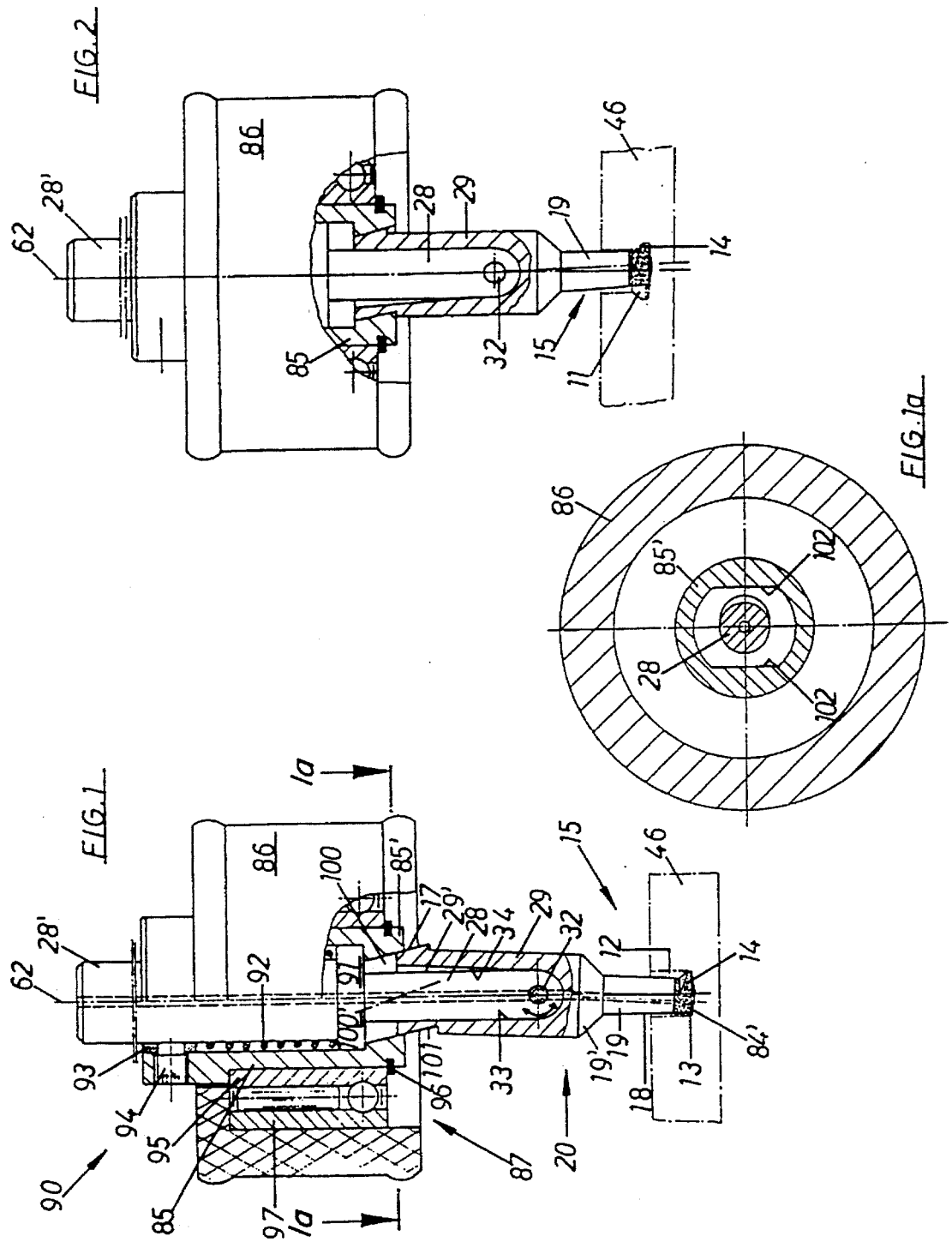

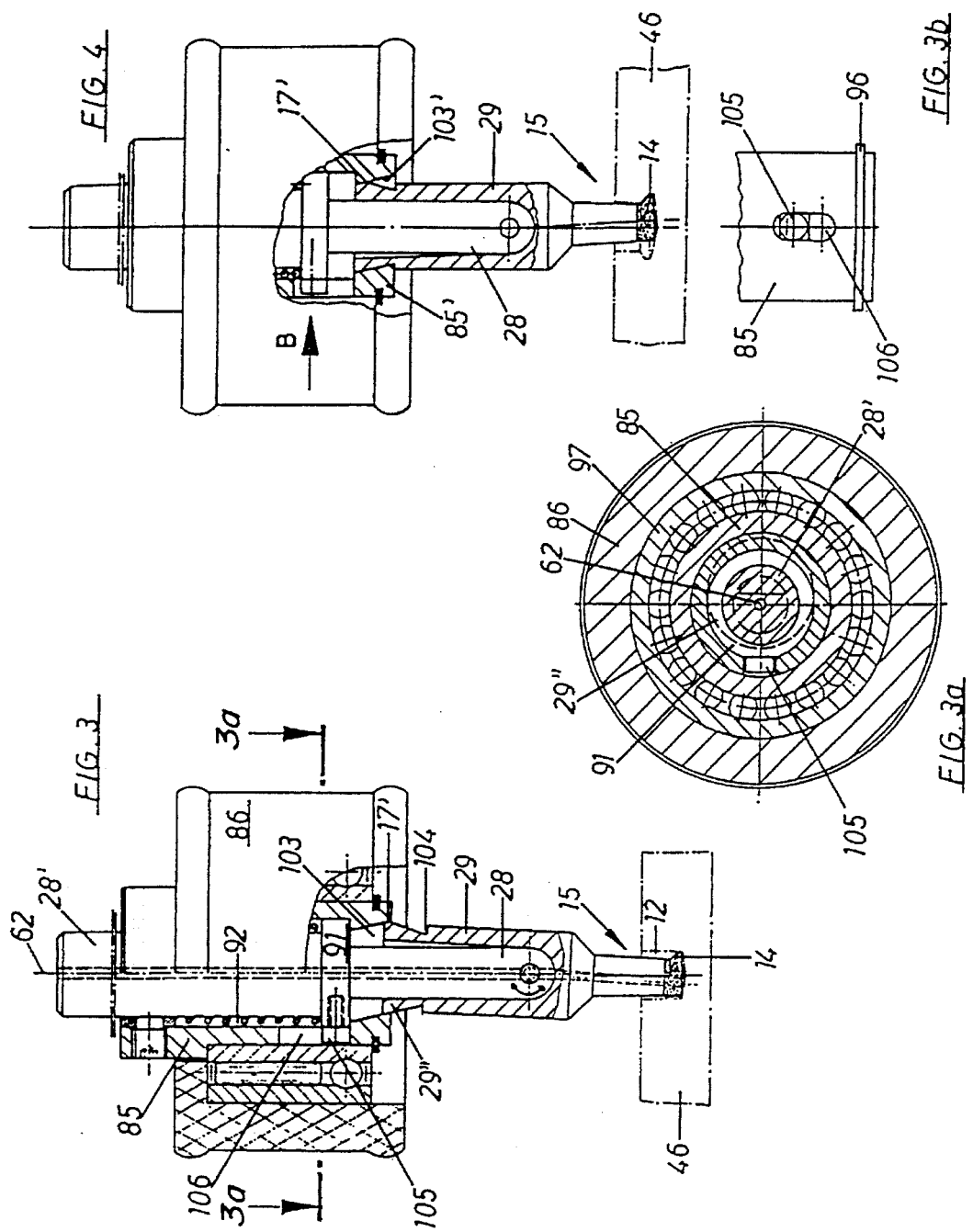

DRILLING APPARATUS FOR PRODUCING DRILLED HOLES WITH UNDERCUTS

This application is a continuation of application Ser. No. 07/865,063, filed Apr. 8, 1992, now abandoned.

The invention relates to a drilling apparatus for producing drilled holes with undercuts, with a drill, the shank of which has a cutting edge that protrudes radially beyond the periphery of the drill shank and, on its periphery opposite the side cutting edge, has a flattening that makes it possible to insert the side cutting edge into the drilled hole, and the shank of which drilling apparatus is firmly connected with an articulated connecting coupling, which is disposed between the drill and the drill driving mechanism and permits wobbling motions of the shank as the drill is rotating and has, on the drill driving mechanism side, a coupling with an axially movable actuating sleeve or indentor, which can be supported on an inclined plane or conical section of a coupling piece that is connected with the drill shank, which inclined plane or conical section brings about the radial advance of the side cutting edge.

A drilling apparatus with the above distinguishing features is known from the German laid open application DE 38 42 683 A1 filed Dec. 19, 1988. In the case of such known apparatus, the drill shank with the side cutting edge and the drill shank-side coupling or portion of the connecting coupling are disposed eccentrically to the axis of rotation, which eccentricity is determined by the drill driving mechanism-side coupling. The drill shank or the drill shank-side portion of the coupling fastened to the drill shank is constructed in such a manner as to have its center of gravity lying outside of the axis of rotation so that this coupling, with the drill attached thereto, is always aligned by the action of centrifugal forces when the drill is being driven, so that the side cutting edge is in a position in which the drill shank can be introduced into a cylindrical, pre-drilled hole without radial deflection of the side cutting edge of the drill shank against the wall of such hole. At the upper end of the coupling on the drill shank side, an effective inclined plane is disposed in the form of a conical surface shell that tapers in the direction of the drill driving mechanism. The actuating sleeve or indentor is disposed adjacent to the inclined plane or conical surface and, at the adjacent body end, has a matching conical recess, which tapers corresponding to the conical section of the coupling on the drill shank side whereby the indentor or actuating sleeve can be pushed onto the inclined plane of the drill shank-side coupling, when the indentor is moved vertically downwardly in the direction of the drill. By these means it is possible, with a rotationally driven drill, to shift the orientation of the drill shank-side coupling counter to the centrifugal force acting upon it about its transverse axis, at which it is connected to the drill driving mechanism-side of a coupling, so that the shank-side coupling can swivel in a plane, in such a manner, that the inclined plane or conical section of such shank-side coupling is acted upon by pressure or force of the inclined section of the actuating sleeve and a radial advance of the side cutting edge is attained. The undercutting process at the bottom of the drilled orifice takes place in such a manner, that the drill is set to rotate by the drill driving mechanism and consequently is aligned as described above. The side cutting edge upon the end of drill shank is inserted into the pre-drilled hole, whereupon or after which the interior conical portion of the indentor acts upon the exterior conical portion of the drill shank-side coupling, so that the side cutting edge is advanced radially to the side. When the indentor has been pushed or biased against the force of reaction produced by the under cutting process far enough on the drill shank-side coupling, the indentor can be let go. Thereupon, the drill shank-side coupling, together with the drill, aligns itself so that the side cutting edge becomes free of the undercut and the drill can be pulled out of the finished, undercut drilled hole. However, it has turned out that the self-alignment of the drill is not sufficient in all cases. If, for example, the drilling dust from the action of the drill is not adequately removed from the drilled hole or if the drill driving mechanism fails, the self-alignment of the drill for removal from the hole comes about only inadequately, if at all. The drill can then not be pulled out or pulled out only with hindrance from the drilling dust or the undercut. If the drill is to be used, aside from producing the undercut, also to produce the pre-drilled hole or the drilled hole, it may happen, as a result of inhomogeneities of the material and/or of tilting motions of the driving machine or the like, that the centrifugal force action which normally frees the side cutting edge from the undercut and, with that, the alignment of the drill for removal from the hole are adversely affected or are inadequate.

It is therefore an object of the invention to improve a drilling apparatus with the aforementioned features in such a manner, that the drill, when producing a pre-drilled hole in a workpiece, can be forcibly guided against radial motions by the axial advance of the drill or pulled out of the finished, undercut, drilled hole, even when self-alignment of the drill shank-side coupling normally taking place as a result of centrifugal forces, is not adequate or possible.

Pursuant to the present invention, this objective is accomplished owing to the fact that the actuating sleeve or indentor axially overlaps the drill shank-side coupling at all time and is positively coupled radially with this coupling.

It is important for the present invention that the drilling apparatus is constructed to provide a forced guidance of the drill shank-side coupling or of the drill. For this purpose the continuous axial overlapping of the drill shank coupling and indentor, which is not provided in the known apparatus, as well as the radial, positive coupling of the indentor with the drill shank-side coupling provide such continuous forced guidance. Each axial movement of the indentor therefore corresponds to a radial movement of the drill shank-side coupling and, with that, of the cutting edge. The indentor can also be used to deliberately move the drill shank radially back and forth in the pre-drilled hole in order, for example, to facilitate removal of the drilling dust. The area of application of the drilling apparatus is increased thereby, on the one hand, for rough work, when, for example, large amounts of drilling dust are produced and, on the other, for fine work when sensitive radial guidance is required. The possible, complete axial load alleviation of the drill by the forced radial guidance of the drill shank-side coupling is of particular advantage.

A structurally simple construction of the drilling apparatus results when the couplings are connected with one another over a transverse axis and the indentor positively embraces the drill shank-side coupling at the level of the inclined plane with a guiding recess, which has a recess axis, which is parallel to the inclined plane and at an angle to the axis of rotation. Due to the above-described connection of the couplings of the drill side and drive side of the apparatus with one another, the pivotability exists only in a single plane. Consequently, the radial, positive assembly between the indentor and the adjacent end of the drill shank-side coupling can be matched only to this possibility of pivoting in a single plane. By these means, it becomes simpler to manufacture the guiding recess or the indentor-side construction of the drill shank-side coupling.

An advantageous construction of the drilling apparatus with large effective surfaces between the indentor and the drill shank-side coupling and consequently in which little surface pressure exists is attainable if the inclined plane, which brings about the radial advance of the side cutting edge, is a flat surface, matching which, diametrically opposite on the drill shank-side coupling, a flat parallel surface is present and if the indentor has, at its drill-side end, two guide surfaces, which are approximately parallel to one another and which embrace the flat surfaces of the drill shank-side coupling torsionally positively. Such mutually parallel surfaces can easily be manufactured with high accuracy both upon the drill shank-side coupling as well as upon the indentor. Moreover, a non-twisting connection results between the coupling and the indentor, despite their relative axial displaceability. Such embodiment of the invention is distinguished particularly by the possibility of transferring high rotational driving forces.

The manufacture of the apparatus is simplified further, if the apparatus is constructed so that the indentor has a circular, cylindrical guiding recess and so that the drill shank-side coupling has a configuration at the end, which is conically tapered towards the drill with an inclined plane adapted to interengage with the circular, cylindrical guiding recess of the indentor. The circular, cylindrical guiding recess can be produced very precisely by a simple drilling process and the drill shank-side coupling, which is constructed essentially rotationally symmetrical, can also be constructed with little manufacturing effort. Despite its circular cross section, the aforementioned apparatus can be constructed, so that the indentor is connected in a torsionally positive manner with the drill shank-side coupling. The torsionally positive connection between the indentor and the drill shank-side coupling can be constructed in accordance with the requirement of the invention, for example, at a place particularly suitable for the purpose and with particularly suitable means. The contact region between the drill shank-side coupling and the indentor is completely relieved of the necessity to transfer rotational driving forces. This can be of advantage in attaining an easy radial adjustability.

The invention is described by means of embodiments shown in the drawing, in which FIG. 1 shows a partially cut away side view of the drilling apparatus of the invention.

FIG. 1a is taken along section A—A of FIG. 1.

FIG. 2 shows a representation similar to the of FIG. 1, with the side cutting edge of the drilling apparatus of FIG. 1 radially moved into cutting position.

FIGS. 3, 3a and 4 are representations corresponding to those of FIGS. 1, 1a and 2, showing a modified construction of the contact region between the indentor and the drill shank-side coupling and FIG. 3b shows the view B of FIG. 4.

The drilling aperture 90, shown in FIG. 1, is used with a workpiece 46 by previously producing a pre-drilled hole 12, which has the drilled-hole longitudinal section shown in FIG. 1. The pre-drilled hole 12 either is produced with a drill separate from the drill 15 shown in the Figures or the drill 15 itself is used to produce it and is equipped for this purpose with the same side cutting edge or may have a different, cutting drill tip. After the pre-drilled hole 12 is produced, the undercut 11, which can be seen in FIG. 2, is produced with the drill 15, which has a drill shank 19, at the tool-side tip of which a side cutting edge 14 is disposed. The side cutting edge 14 protrudes radially during operation from the axis of rotation 62 of the drilling apparatus 90. It may be provided during use with a cutting powder 84 or equipped in the conventional manner with a laterally effective, small, hard alloy plate. The drill shank 19 has a flattened external periphery 18, the flattening of which extends practically over the whole length of the drill shank and is dimensioned, so that the drill shank 19 can be inserted without problems into the drilled hole despite the presence of the side cutting edge 14. The flattening 18 is inclined at an angle of, for example, 4.7° and extends uniformly between the tip 13 of the drill shank 19 up to the drill shank end 19'. In the region of the tip 13, an overall diameter results, measured over the side cutting edge 14 that is somewhat smaller than the diameter of the pre-drilled hole 12. In spite of the flattening 18 that extends over the length of the drill shank 19, the drill shank 19, in the region of this flattening is over its whole length about the radius of the drilled hole 12, only the center of the radius being disposed increasingly eccentrically from the axis of rotation 62. A cross section of the drill shank 19 above the side cutting edge 14 would reveal a spindle, which would be symmetrical with respect to the longitudinal axis through the two corners, even if the external periphery, which is above the side cutting edge 14 and opposite to the external periphery 18, were flattened in the same way. Between the drill 15 and the drill driving mechanism, which is not shown and is, for example a drilling machine driven by an electric motor, there is a two part connecting coupling 20, which consists essentially of a drill shank-side coupling member 29 and a drill driving mechanism-side coupling member 28. The two coupling members or parts 28, 29 are connected to one another about a transverse axis or pin 32. By means of this axis or pin 32, it is established that the drive side coupling 28 and the drill shank 19 can move relative to one another only in the directions of the plane of the drawing indicated by the double arrow. These directions determine the directions of movement of the side cutting edge 14. The maximum relative swiveling movement or amplitude of the top driving side coupling 28 in relation to the bottom coupling 29 or the reverse is determined by the recess 29 within the coupling 29. The latter has a wall section 33 as drill stop, as well as a wall section 34, which lies opposite wall section 33 as undercutting stops, which function as swiveling stops. These wall sections are constructed so that they make possible the relative swivelability of the couplings 28, 29 which can be seen by comparing FIGS. 1 and 2.

The coupling member 28 of the connecting coupling 20 is provided with a driving connection 28' which is constructed as a spigot. The driving connection 28' has a ring collar 91, on which a compression spring 92 is supported with its one end, while its other end is supported at a sliding ring 93, which surrounds the driving connection 28' and is axially displaceable on the driving connection. The compression spring 92 is surrounded by an actuating indentor 85, which is constructed as a sleeve. At the upper end of the actuating sleeve or indentor 85, there is a transversely adjustable fastening screw 94, which has a polygonal socket head and engages an unlabeled recess of the sliding ring 93. At its external periphery, the indentor 85 has anti-friction bearing 87, the inner ring 59 of which abuts a shoulder of the indentor 85 and is held in this position with a retaining or locking ring 96. The outer ring 97 of the friction bearing 87 is firmly connected with a grip end 86, which can be rotated relative to the indentor or actuating sleeve 85, but cannot be shifted axially with respect to such sleeve.

The actuating sleeve or indentor 85 is connected torsionally positively with the drill shank-side coupling member 29 along a guiding recess 100. The guiding recess 100 has a recess axis 100', which, together with the axis of rotation 62, encloses or defines an acute angle. The guiding recess 100 of the drill-side end 85' of the actuating sleeve indentor 85 has two guiding surfaces 102, which can be seen particularly in FIG. 1a, which are flat and inclined approximately at the angle of the guiding recess 100 within the end of the actuating sleeve or indentor 85. Of these, the guiding surface 102 at the left in the representations has a somewhat larger angle than the opposite guiding surface, in order to take into consideration the change in the angle of the coupling 29 when changing over from the position shown in FIG. 1 to the position shown in FIG. 2. The guiding surfaces 102 correspond to an inclined plane 17 and a last, parallel, plane surface 101, which works together with the guiding surfaces 102. When the outer grip 86 is manually guided vertically downwards, pressure acts on the inclined plane 17 and leads to a swiveling motion of the drill shank-side coupling 29 in the counterclockwise direction. The swiveling motion is carried out, or continued, until the wall section 34 lies against the drill shank-side coupling 28. The coupling members 28 and 29 then have a position relative to one another, which can be seen in FIG. 2. The coupling 29 is immersed as far as possible in the indentor 85 and the side cutting edge 14 is advanced radially to the outside as far as possible, so that the undercut 11 results in the workpiece 46.

After the undercut 11 is produced, the outer grip 86 is let go or released, so that the actuating sleeve, thrust piece or indentor 85 can be moved upwards under the action of the compression spring 92. The coupling 29 consequently is swiveled back in the clockwise direction and once again assumes the position shown in FIG. 1. Should the force of the spring 22 be inadequate, the actuating sleeve or thrust piece 85 can also be guided upwards manually by positive movement of the outer grip 86. After that, the drill 15 can be pulled out of the finished drilled hole.

FIG. 3 shows a recess shape, which, compared to FIG. 1, is modified only in the region of a guiding recess 103. The guiding recess 103 is constructed as a drilled hole with an annular cross section. Accordingly, the adjacent end 29" of the coupling member 29 is constructed conically and tapers downwardly in the direction of the drill 15. The annular groove 104, which can be seen in the drawing, results. The inclined plane 17' for producing a radial advance of the side cutting edge 14, constitutes a sloping surface, which is matched to the guiding recess 103. Consequently, radial forces can be transferred with the actuating sleeve or indentor 85 to the coupling 29, so that this can be swiveled in the direction or plane of the double arrow. However, it is not possible to transfer rotational driving forces directly with the thrust piece 85 over the end 29" of the coupling 29, since the participating component parts are constructed to be rotationally symmetrical. Consequently, there is a special, torsionally positive connection between the actuating sleeve or indentor 85 and the coupling 28, namely, a connecting screw 105, which is screwed into the annular collar 91 of the coupling 28 and engages with its head a slot 106 within the actuating sleeve or indentor 85. The design of the slot 106 as a longitudinal hole can be clearly seen in FIG. 3b. It can be seen from FIG. 3a that relative twisting is excluded. By means of a broken line, this Figure shows the relative, eccentric position of the end 29" of the coupling 29 in relation to the axis of rotation 62.

When the actuating sleeve or indentor 85 is shifted downwards by being actuated by way of the outer grip 86 after the drill 15 is inserted into the pre-drilled hole 12 of the workpiece 46, there is a lateral shift of the side cutting edge 14 in the counterclockwise direction, so that the end 85' with its guiding surface 103' of the guiding recess 103 glides on the inclined plane downwards in the direction of the workpiece 46 and, in doing so, partially dips into the annular groove 104, until the maximum swiveling of the drill 15, which is determined by the wall section 34, is reached. With this, the measure for the maximum swivelling of the side cutting edge 14 is determined in advance, as in the case of the thrust piece 85 of the embodiment of FIGS. 1 and 2, which has been shifted vertically downwards. In the case of the drilling apparatus of FIGS. 3 and 4 also, the compression spring 92, optionally with manual support, also acts in the sense of a swivelling of the coupling 29 in the clockwise direction, so that the latter assumes its starting position once again and the drill 15 can be pulled out of the finished undercut, drilled hole.

In the case of the embodiments described above, it was assumed that the actuating sleeve or thrust piece 85 is acted upon manually. It is, however also possible to adjust the actuating sleeve or thrust piece 85 by machine, for example, pneumatically.

I claim:

1. Drilling apparatus for producing drilled holes with undercuts using a drill having a side cutting blade edge protruding radially beyond the periphery of the drill shank, and a flattened portion upon its circumference, opposite the side cutting blade edge, the distance from the edge of the flattened portion to the tip of the cutting blade being slightly less than the diameter of a borehole to be undercut which makes possible the insertion of the drill shank and side cutting edge into the borehole, the drill shank being firmly connected with a connecting coupling having inner and outer sections pivoted to each other adjacent the drill shank, disposed in an articulated fashion between and connecting the drill and a drill driving mechanism, and having a drill shank-side coupling slidingly engaged with an axially movable indentor through inner and outer interengageable surfaces when the indentor is moved axially toward the drill-shank side coupling characterized in that the indentor overlaps the drill shank-side coupling at all times along an inclined interengagement section and is radially coupled positively with this coupling in a manner such that movement of the interengagement point of the shank-side coupling and the indentor varies the inclination of the drill shank.

2. The apparatus of claim 1, characterized in that the inner and outer coupling sections are connected with one another along a transverse axis and that the indentor positively encircles the drill shank-side coupling at the level of the inclined interengagement section with a guiding recess which has a recess axis and at an angle to the axis of rotation.

3. The apparatus of claims 1 or 2, characterized in that the interengagement section includes an inclined plane, which effects radial advance of the side cutting edge and which is a plane surface, diametrically opposite which on the drill shank-side coupling a matching plane, parallel surface is provided and that the indentor has at its drill-side end two mutually parallel guiding surfaces which embrace the plane surfaces of the drill shank-side coupling to effect positive torsion thereof.

4. The apparatus of claim 1, characterized in that the indentor has a circular, cylindrical guiding recess and that: the drill shank-side coupling has an end, tapering conically towards the drill and has an inclined plane intermeshing with the circular, cylindrical guiding recess of the indentor.

5. The apparatus of claim 4, characterized in that the indentor is connected by a connecting means positively with respect to torsion with the drill driving mechanism-side coupling.

6. The apparatus of claim 2 characterized in that the indentor has a circular, cylindrical guiding recess and that the drill shank-side coupling has an end tapering conically towards the drill and has an inclined plane intermeshing with the circular, cylindrical guiding recess of the indentor.

7. The apparatus of claim 6 characterized in that the indentor is connected by a connecting means positively with respect to torsion to the drill driving mechanism-side coupling.

8. The apparatus of claim 3 characterized in that the indentor has a circular, cylindrical guiding recess and that the drill shank-side coupling has an end tapering conically towards the drill and has an inclined plane intermeshing with the circular, cylindrical guiding recess of the indentor.

9. The apparatus of claim 8 characterized in that the indentor is connected by a connecting means positively with respect to torsion with the drill driving mechanism-side coupling.

10. A drilling apparatus for producing drilled holes having undercut lower ends by means of a rotating shank having a radially extending cutting blade at the lower end of said shank and a flat cut-away portion on the shank opposite to the cutting blade such that the dimension across the shank from the tip of the cutter blade to the flat portion on the shank is slightly less than the diameter of the drilled hole to be undercut comprising:

(a) an articulated coupling for rotational connection of the shank of the cutting blade and a drive means along a drive axis, (b) said articulated coupling including a first coupling member for connection to the shank of the cutting blade and a second coupling member for connection to a drive means, (c) the first coupling member having a longitudinal internal recess with dimensions sufficient to encompass the second coupling member which fits therein with sufficient clearance to allow slight rotation of the second coupling member within the first coupling member about a pivot connection between the two near the cutting blade shank end, (d) an actuating sleeve surrounding the second coupling member and having a lower interengagement, section for directly engaging a conforming interengagement section at the opposite end of the first coupling member from the cutting shank, (e) said two interengagement sections upon the actuating sleeve and the first coupling member being arranged at an inclination from the drive axis of the articulated coupling and being continuously engaged over at least a portion of said sections, (f) the angle of said first coupling means over the second coupling means about the pivot connecting the two being variable within the limit of the confines of the first coupling means dependent upon the relative position and degree of interengagement between the interengagement sections of the actuating sleeve and the first coupling member.

11. A drilling apparatus in accordance with claim 10 wherein the inclined interengagement sections of the actuating sleeve and the first coupling member are flat plane surfaces.

12. A drilling apparatus in accordance with claim 10 wherein the inclined interengagement sections of the actuating sleeve and the first coupling member are cylindrical surfaces.

13. A drilling apparatus in accordance with claim 12 wherein the actuating sleeve and the second coupling member are secured against torsional rotation with respect to each other by pin means passing between the two.

14. A drilling apparatus in accordance with claim 11 additionally comprising coil spring means for biasing the actuating sleeve to the minimum interengagement position with the first coupling means.

15. A drilling apparatus in accordance with claim 13 additionally comprising coil spring means for biasing the actuating sleeve to the minimum interengagement position with the first coupling means.

* * * * *